United States Patent
Mendia Olabarria

(10) Patent No.: US 9,089,937 B2
(45) Date of Patent: Jul. 28, 2015

(54) RETRACTABLE SHANK FOR MACHINE TOOLS AND USE OF SAID RETRACTABLE SHANK IN MACHINE TOOLS

(75) Inventor: Angel Maria Mendia Olabarria, Eibar (ES)

(73) Assignee: SORALUCE, S. COOP., Bergara (Gipuzkoa) (ES)

( * ) Notice: Subject to any disclaimer, the term of this patent is extended or adjusted under 35 U.S.C. 154(b) by 493 days.

(21) Appl. No.: 13/517,914

(22) PCT Filed: Dec. 12, 2010

(86) PCT No.: PCT/ES2010/000514
§ 371 (c)(1),
(2), (4) Date: Jun. 20, 2012

(87) PCT Pub. No.: WO2011/083185
PCT Pub. Date: Jul. 14, 2011

(65) Prior Publication Data
US 2012/0257941 A1 Oct. 11, 2012

(30) Foreign Application Priority Data

Dec. 22, 2009 (ES) .................. 200902377

(51) Int. Cl.
*B23C 1/02* (2006.01)
*B23Q 5/04* (2006.01)
*B23Q 1/70* (2006.01)
*B23Q 5/22* (2006.01)

(52) U.S. Cl.
CPC *B23Q 5/043* (2013.01); *B23Q 1/70* (2013.01); *B23Q 5/225* (2013.01); *Y10T 409/309296* (2015.01); *Y10T 409/309352* (2015.01)

(58) Field of Classification Search
CPC .............. B12C 9/00; B12C 9/05; B12C 1/02; B12C 1/027; B23Q 3/106; B23Q 3/107; B23Q 3/108; B23Q 1/703; B23Q 1/70
USPC .......... 483/9, 8; 409/144, 230, 231, 232, 233, 409/190, 191, 189, 198
See application file for complete search history.

(56) References Cited

U.S. PATENT DOCUMENTS

| | | | | |
|---|---|---|---|---|
| 2,175,592 A * | 10/1939 | Bennett | ......................... | 409/144 |
| 4,012,818 A * | 3/1977 | Dornbluth et al. | .............. | 483/32 |
| 4,548,532 A * | 10/1985 | Watanabe et al. | ............. | 409/233 |
| 4,620,824 A * | 11/1986 | Eckstein et al. | .............. | 409/233 |
| 5,322,494 A * | 6/1994 | Holtey et al. | ................... | 483/12 |
| 5,342,155 A * | 8/1994 | Harroun | ........................ | 409/131 |
| 5,795,114 A * | 8/1998 | Schweizer et al. | ............. | 409/233 |
| 2010/0145496 A1* | 6/2010 | Tang et al. | .................... | 700/174 |
| 2010/0207496 A1* | 8/2010 | Tatsuda | ........................ | 310/67 R |

FOREIGN PATENT DOCUMENTS

| | | |
|---|---|---|
| DE | 3334001 A1 | 4/1985 |
| EP | 0330905 A2 | 9/1989 |
| EP | 1126941 A1 | 8/2001 |
| WO | WO 2009072770 A2 * | 6/2009 |

* cited by examiner

*Primary Examiner* — Daniel Howell
*Assistant Examiner* — Nicole N Ramos
(74) *Attorney, Agent, or Firm* — Lucas & Mercanti, LLP

(57) ABSTRACT

The present invention relates to a retractable shank for machine tools and use of said retractable shank in machine tools made up of a shank core, on which there is arranged at least one front unit formed by a rotating bush which is associated, by means of bearings, with respect to a fixed portion of the machine structure, this front unit being removable by means of outwards extraction or inwards movement, leaving a space in which the rear rotating shaft of the headstock can be housed.

14 Claims, 14 Drawing Sheets

RETRACTABLE SHANK FOR MACHINE TOOLS AND USE OF SAID RETRACTABLE SHANK IN MACHINE TOOLS

This is a National Phase under 35 U.S.C. 371 of International Application PCT/ES2010/000514, filed on Dec. 14, 2010, which claimed the priority of Spanish Application No. P200902377, filed Dec. 22, 2009, the entire content of both Applications are hereby incorporated by reference.

FIELD OF THE ART

The present invention relates to changing headstocks in machine tools, such as milling machines and boring machines, proposing to that end a retractable shank which allows assembling different headstocks, the rear rotating shaft of the headstock being inside the machine tool.

STATE OF THE ART

There are different types of machines within the sector of machine tool, such as milling machines and boring machines, which are formed by a horizontal table fixed to the ground on which there is arranged a part to be machined, a column on which a carriage or a console slides vertically inside which carriage or console there is arranged a tool box and/or a shank sliding horizontally in a direction perpendicular to the longitudinal axis of the table.

These machines have different types of morphologies depending on the movements of their different structural portions; therefore, the table in which there is arranged the part to be machined can be fixed on the ground, whereas the column performs a translational movement on the horizontal plane; the table being able to be that which performs the translational movement in the horizontal plane and the column is fixed; or it may be the case where both the column and the table perform a translational movement in said horizontal plane.

One or another type of tool is arranged depending on the type of machining to be performed, for example, if a hole is to be bored, a boring tool is arranged at the end of the shank facing the part, where the minimum machining diameter is determined by the diameter of the shank, and the maximum depth is determined by the length and axial path of the shank, or by the sum of the lengths of the shank and of the tool box if there is one. On the other hand if milling in different angles in the space is to be performed, the shank is moved to its most retracted position, allowing the coupling of a milling headstock to the tool box or to the carriage if there is no tool box and where the shank is connected to a rear rotating shaft of the headstock.

In machine tools of this type the shank can be arranged inside the tool box or inside the carriage, depending on the type of machines, but in both cases the shank is made of one or several parts which are attached to one another in a solid manner and cannot be separated during machine working phase, forming a single unit. This shank is arranged inside a unit formed by a rotating bush which rotates integrally with the shank and which is associated, by means of bearings, with a fixed bush that is incorporated to the tool box or to the carriage of the machines. It may also be the case where there is no fixed bush, the bearings being housed directly in the tool box or the carriage, where the shape of the fixed bush is directly reproduced.

This solution has the drawback that the milling headstock is too long when it is arranged on the tool box or the carriage, i.e., the tool assembled in the headstock is far from the column of the machines therefore working area is lost. Specifically the rear rotating shaft of the headstock, known as shaft "C" of the headstock, is on the outside and cannot enter the tool box or the carriage because it abuts the shank and the unit formed by the rotating and fixed bushes.

Therefore it is necessary to provide a solution which allows incorporating shaft "C" of the headstock inside the tool box or the carriage, whereby the working tool of the headstock is closest to the column of the machines and therefore the working area is improved, this fact is particularly relevant for using the maximum transverse path of the headstock or of the table and having maximum working area in parts with large dimensions.

OBJECT OF THE INVENTION

The present invention proposes a retractable shank for machine tools, such as milling machines and boring machines, which allows assembling different headstocks on the tool box of the machines, the shaft "C" of the headstock, i.e., the rear rotating shaft thereof being inside the tool box. The invention describes the case of machine tools with tool box and shank arranged inside a vertical translation carriage, however the concept of the invention is not altered for the case of machines not having a tool box, in which the shank is assembled directly in the carriage of the machine.

The retractable shank object of the invention is made up of a shank core on which there are arranged a rear unit and at least one front unit, where the rear unit is formed by a rotating bush which is associated, by means of bearings, directly with the tool box or through a fixed bush which is coupled to the tool box, such that the shank core rotates integrally with the rotating bush, and where the front unit is formed by another rotating bush which is associated, by means of other bearings, with respect to a fixed portion of the machine structure, this front unit being automatically removable by means of outwards extraction or inwards movement, leaving a space in which the rear rotating shaft of the headstock can be housed.

In a preferred embodiment of the invention, where the front unit is removable by means of the outwards extraction thereof, the fixed portion of the machine structure which is associated with the rotating bush by means of the bearings of the front unit is a fixed bush forming part of said front unit. The rotating bushes of both front and rear units are arranged such that they are retained for their synchronized rotation through suitable attachment means, whereas the fixed bush of the front unit has anchoring means for its automatic coupling to the tool box.

Therefore by moving the shank core to its most retracted position inside the tool box and removing the front unit by means of the outwards extraction thereof, a space is left in which the rear rotating shaft of the headstock is susceptible to being housed, whereby the usable working area is improved.

The possibility that the front and rear units are separated by a certain distance, such that the front unit can be removed by means of the inwards movement thereof has been envisaged, therefore, a space where the rear rotating shaft of the head can be housed is also left by moving the shank core to its most retracted position.

It has also been envisaged that the bearings which are arranged between the rotating bushes and the fixed bushes are angular-contact ball bearings, with which the rotation speed is increased and the frictions are minimized. However, without altering the concept of the invention, they can also be other types of bearings, such as for example, magnetic bearings, hydrostatic bearings, aerostatic bearings, or other types of bearings having a low friction coefficient.

According to another embodiment of the invention, the shank core is separated into a rear portion arranged permanently inside the tool box and at least one front portion which is removable by means of the outwards extraction thereof together with the front unit, such that a space is left for housing the rear rotating shaft of the headstock.

A retractable shank for machine tools having very advantageous constructive and functional features for the intended application is therefore obtained, solving the arrangement problem of shaft "C" of the headstock.

DETAILED DESCRIPTION OF THE INVENTION

The object of the invention relates to a retractable shank for machine tools, such as milling machines and boring machines, in which the unit formed by the rotating and fixed bushes is divided, there being at least one front unit which is susceptible to being removed by means of outwards extraction or inwards movement, with which a space is defined in the tool box which allows assembling different headstocks.

Figure 1A:
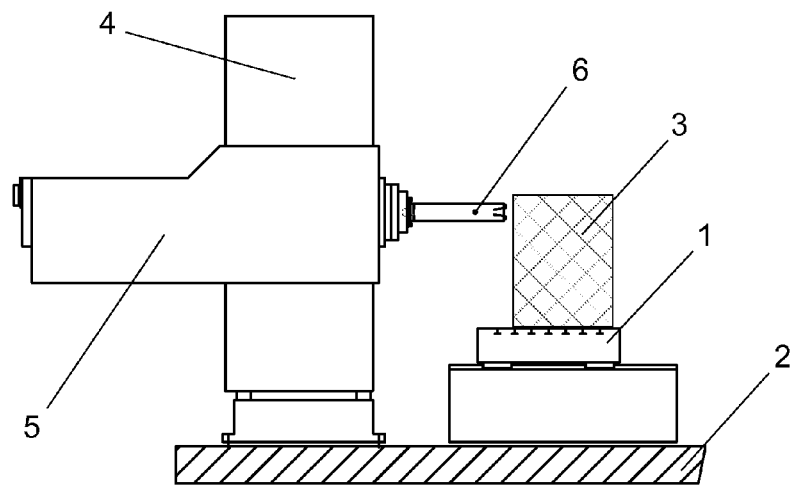
FIGS. 1A to 1D show the schematic views of different types of machine tools.
Figure 1B:
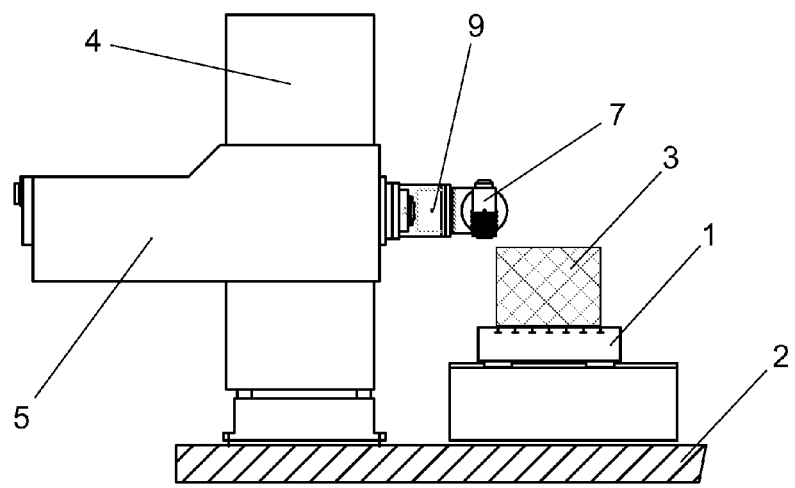

Different types of machine tools can be observed in FIGS. 1A to 1D, FIG. 1A depicting a machine having a horizontal table (1) fixed to the ground (2) on which there is arranged a part (3) to be machined and a column (4) on which a carriage (5) or console slides vertically, inside which carriage or console there is arranged a shank (6) sliding horizontally in a direction perpendicular to the longitudinal axis of the table (1). FIG. 1B shows a machine tool such as that of FIG. 1A, where the shank (6) is retracted for coupling a headstock (7). In these cases the table (1) performs a translational movement on the horizontal plane.

Figure 1C:
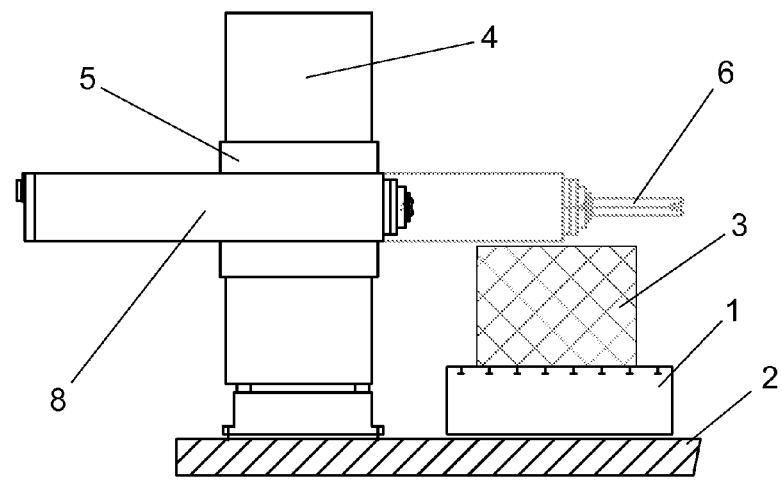
Figure 1D:
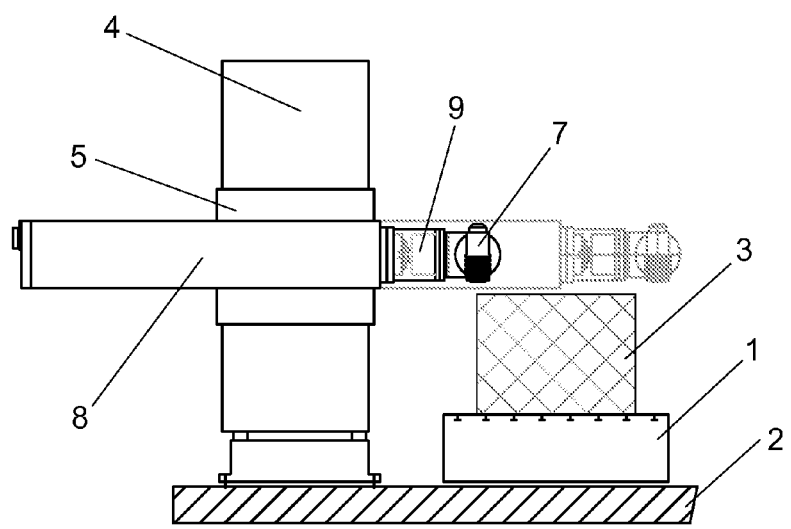

Machine tools where a tool box (8) or RAM is arranged inside the carriage (5), which tool box in turn has therein the shank (6) can be observed in FIGS. 1C and 1D, in this case the table does not need to move on the horizontal plane, since the tool box (8) allows movement in the horizontal plane of the shank (6) (FIG. 1C), or where appropriate of the headstock (7) (FIG. 1D).

Figure 2:
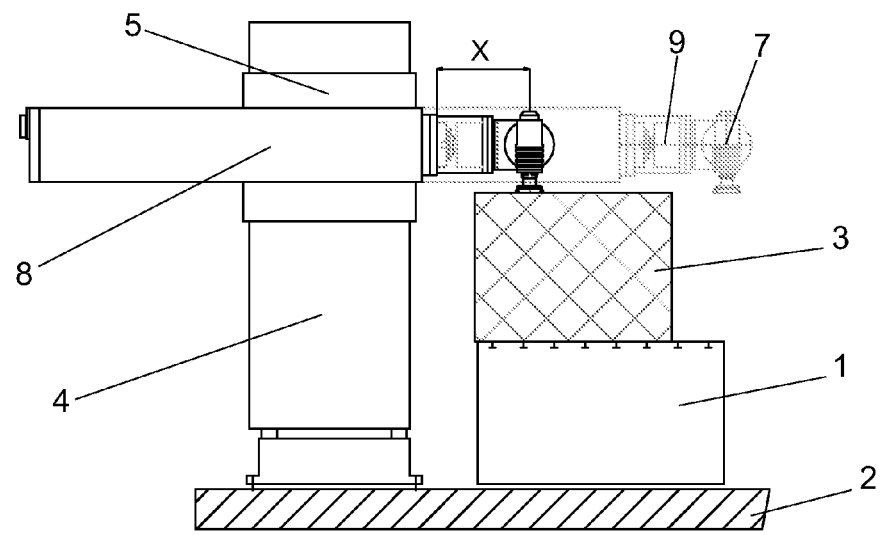
FIG. 2 shows the problem related to the conventional technique for arranging shaft "C" of the headstock, this being outside the tool box and the carriage of the machines.

FIG. 2 shows the problem associated with the conventional technique, how the milling headstock (7) elongated by a distance (X) when it is arranged on the tool box (8), such that working area on the part (3) is lost being observed, specifically the rear rotating shaft (9) of the headstock (7), known as shaft "C", is on the outside and cannot enter the tool box (8) because it abuts the shank (6) and the unit formed by the bushes enveloping it.

Figure 3A:
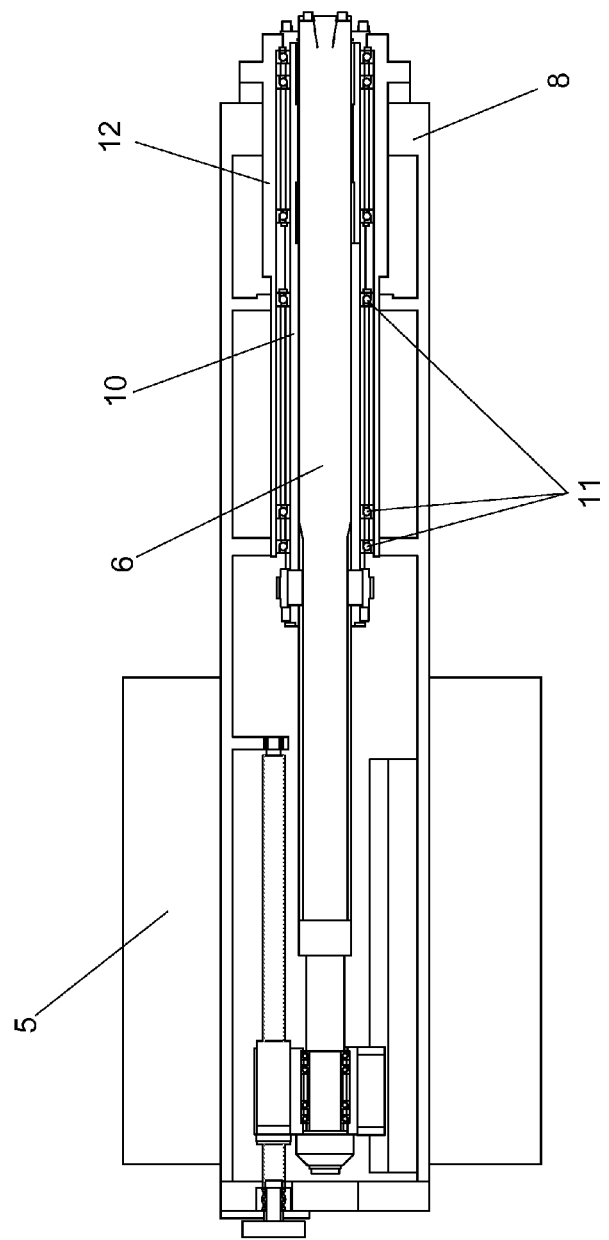
FIGS. 3A and 3B show the configuration of a shank related to the conventional technique, where the shank and the unit formed by the rotating and fixed bushes are made of a single unit, respectively.
Figure 3B:
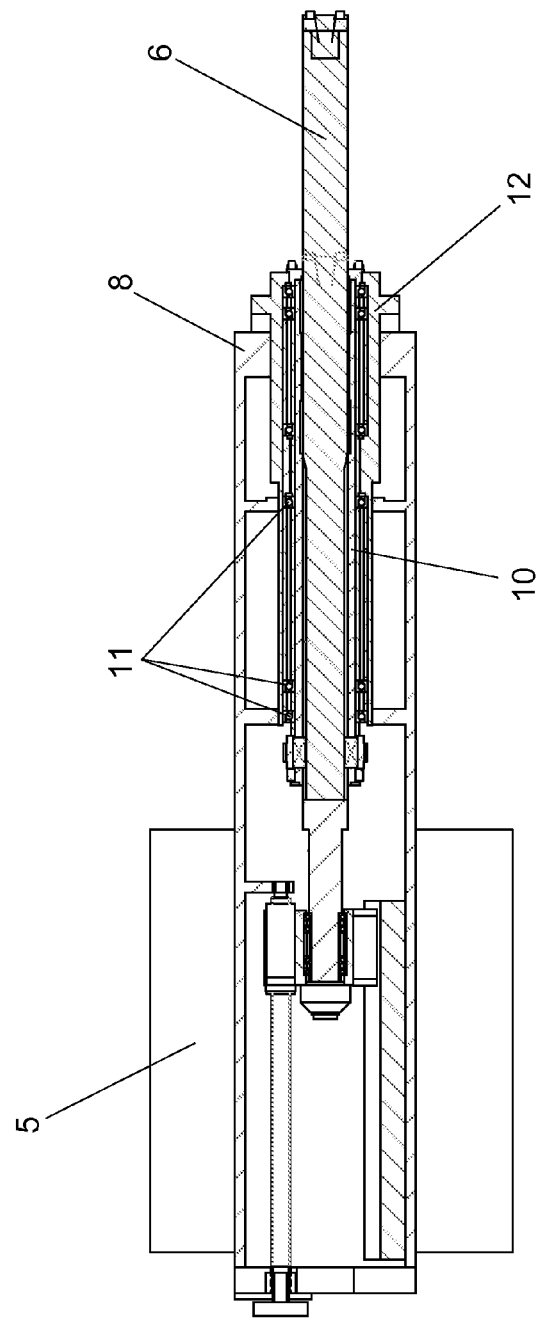

The configuration of a conventional shank (6) is depicted in FIGS. 3A and 3B, one with the shank (6) in its retracted position and the other with the shank (6) in exit position, the shank (6) being made of one or several parts which are attached to one another in a solid manner and cannot be separated during the machine working phase, forming a single unit. Working phase is understood as the time during which the machine is operating (machining time, change of headstocks, tools etc.).

The shank (6) is arranged inside a unit formed by a rotating bush (10), which is associated, by means of bearings (11), with a fixed bush (12) which is arranged incorporated in the tool box (8) of the machine tool. It may also be the case that there is no fixed bush (12), the bearings (11) being housed directly in the tool box (8), where the shape of the fixed bush (12) is directly reproduced.

The present invention proposes a retractable shank for machine tools, which is made up of a shank core (13) on which there are arranged a rear unit and at least one front unit, where the rear unit is formed by a rotating bush (14) which is associated, by means of bearings (16), directly with the tool box (8) or through a fixed bush (15) which is coupled to the tool box (8), such that the shank core (13) rotates integrally with the rotating bush (14), and where the front unit is formed by another rotating bush (17) which is associated, by means of other bearings (16), with respect to a fixed portion of the machine structure, this front unit being automatically removable by means of outwards extraction or inwards movement, leaving a space (19) in which the shaft (9) of the headstock (7) can be housed.

Figure 4A:
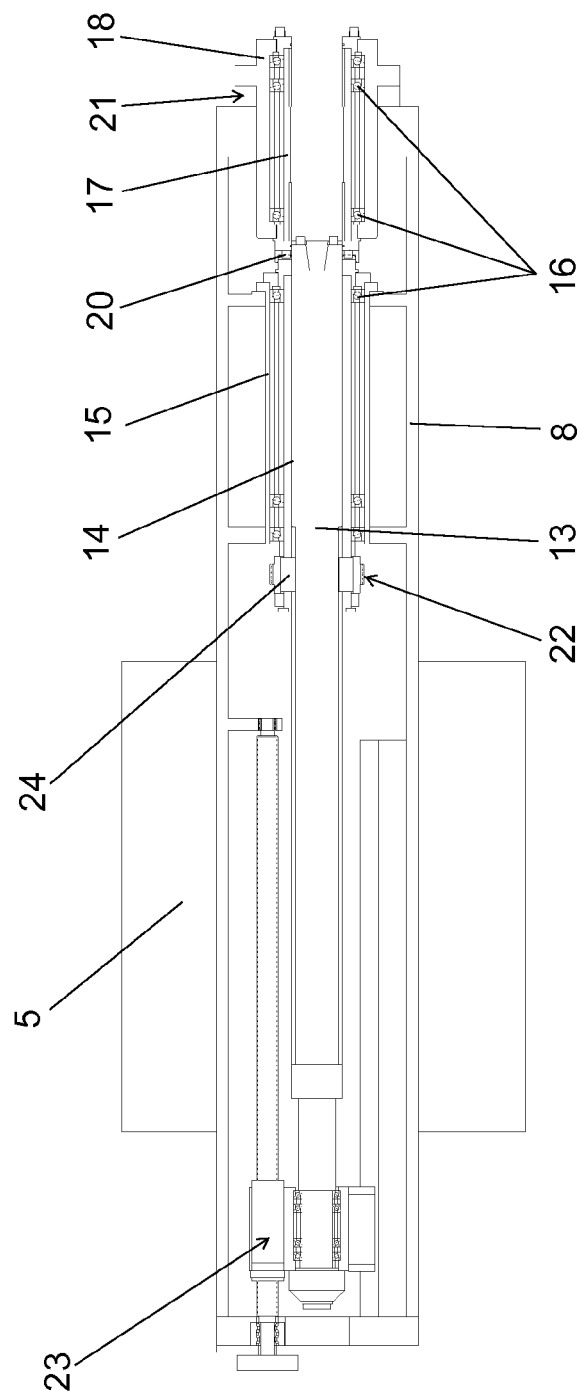
FIGS. 4A to 4C show a preferred embodiment of the retractable shank object of the invention, where the rotating and fixed bushes have a modular configuration, respectively, comprising a rear portion which is kept on the inside and at least another removable front portion.
Figure 4B:
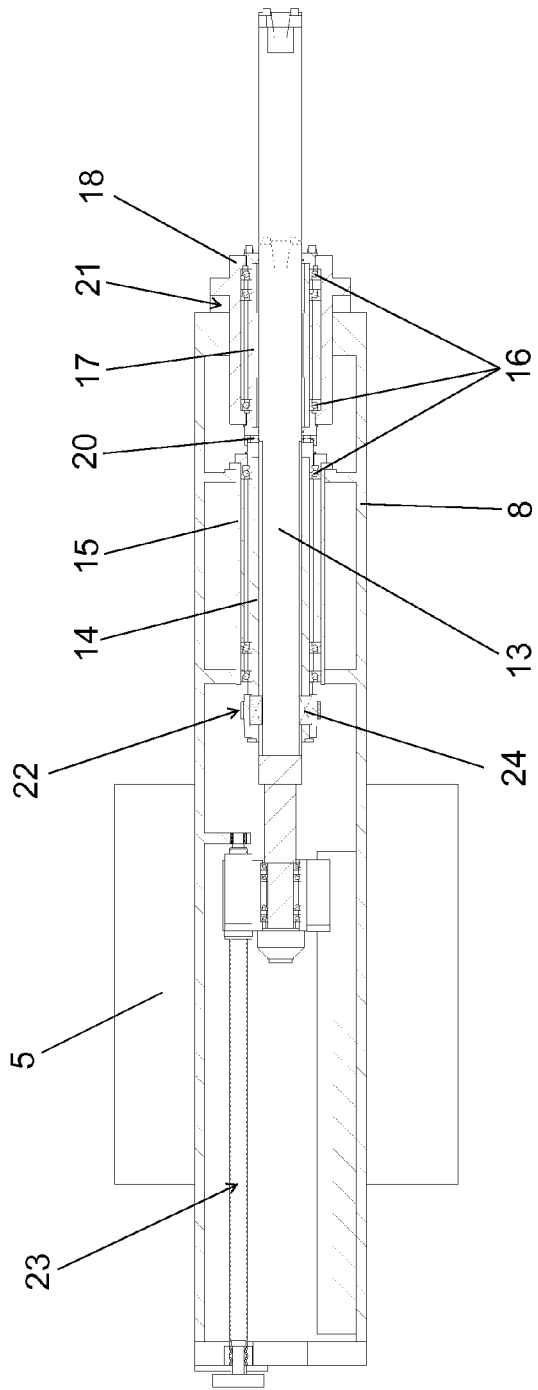
Figure 4C:
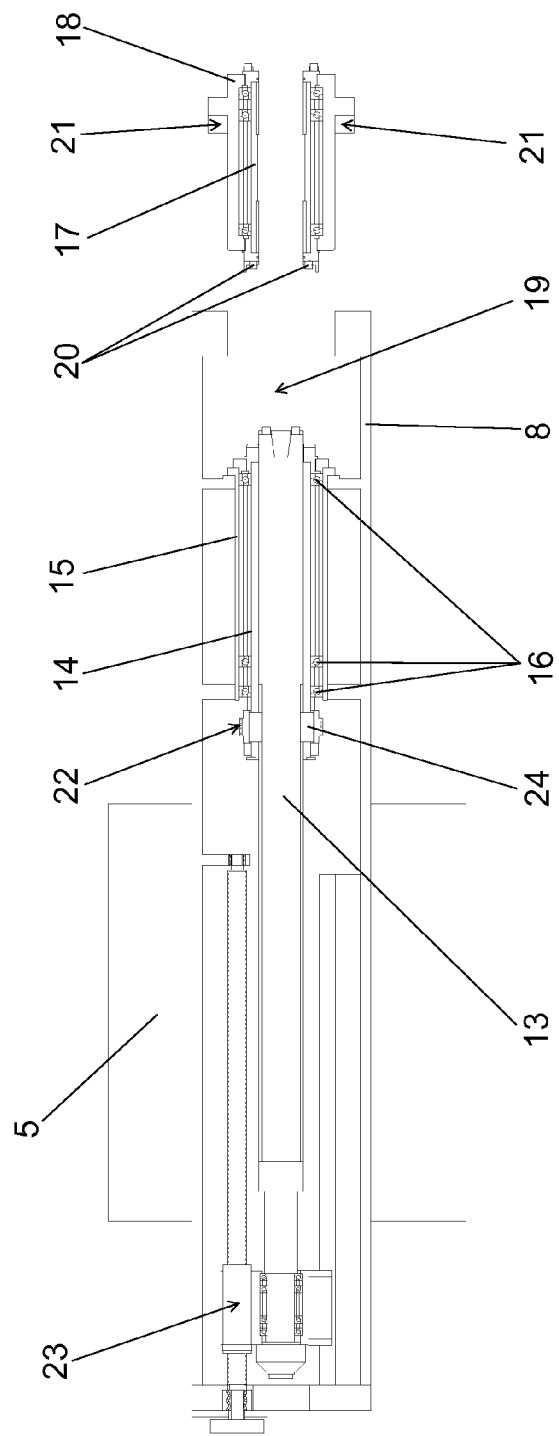

FIGS. 4A to 4C depict a preferred embodiment of the invention, in which the front unit is removed by means of the outwards extraction thereof (see FIG. 4C), in this case the fixed portion of the machine structure which is associated with the rotating bush (17) by means of the bearings (16) is a fixed bush (18) forming part of the front unit.

The rotating bushes (14 and 17) are arranged such that they are retained for their synchronized rotation through attachment means (20), whereas the fixed bushes (15 and 18) are independent of one another, without establishing attachment of any type therebetween, however it may be the case that the fixed bush (15) of the rear unit does not exist, its shape being directly reproduced in the tool box (8). On the other hand the fixed bush (18) has anchoring means (21) for coupling to the tool box (8).

Therefore with this assembly arrangement, the shank core (13) is rotated by a gear (22) which is coupled to the back portion of the rotating bush (14) of the rear unit, such that the shank core (13) rotates integrally with said rotating bush (14), whereas the rotating bush (17) rotates as it is driven due to the retention established by the attachment means (20) with the rotating bush (14). In the back portion of the tool box (8) there is arranged a drive (23), such as for example a ball screw, which transmits the axial movement to the shank core (13).

The synchronized rotation of the shank core (13) with the rotating bush (14) of the rear unit can be performed, among other ways, by means of a keying (24) between both elements, such that the shank core (13) can rotate with the rotating bush (14) and slide axially with respect to it, however the outermost portion of the shank core (13) does not have any association means for direct rotation with the rotating bush (17) of the front unit, said outermost portion of the shank core (13) being subjected to a radial support but not an axial one.

Therefore the outermost portion of the shank core (13) is cylindrical, such that in its exit path out of the tool box (8) the different wastes from the machining cannot be introduced into housings defined for associating the rotation, however the keying (24) could be performed along the entire shank core (13), in which case means for preventing the waste from being introduced in the housings, or means for removing the waste, such as scrapers must be provided.

Figure 5:
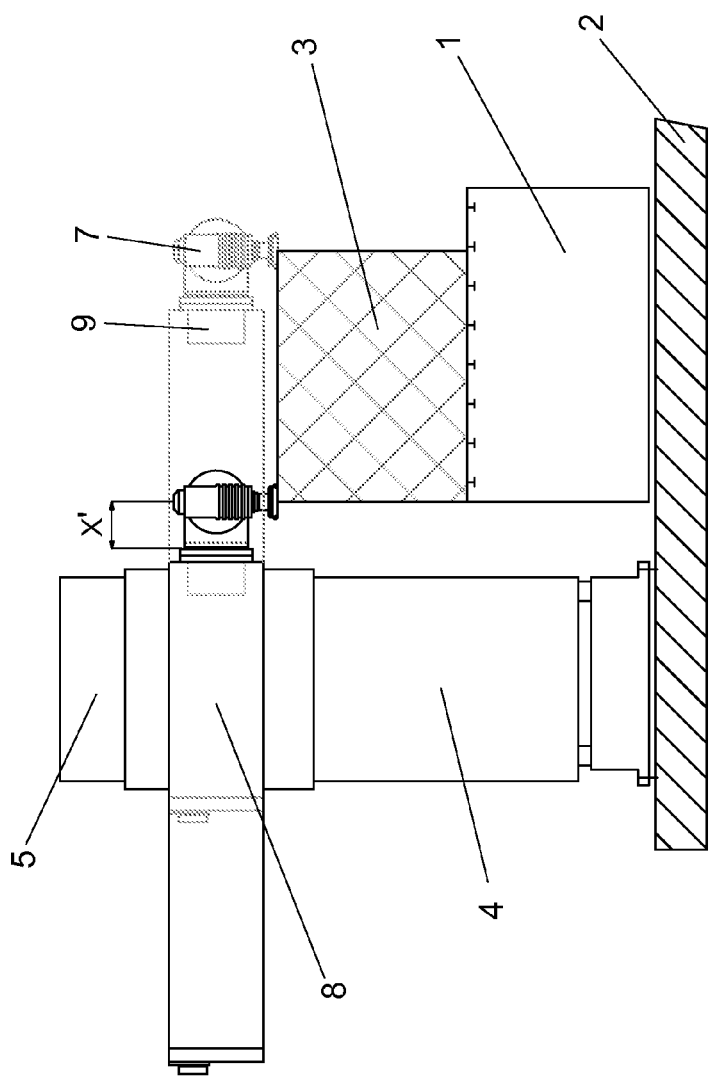
FIG. 5 shows a view where how the problem related to the arrangement of the shaft "C" of the headstock is solved with the retractable shank of the invention is observed.
Figure 6:
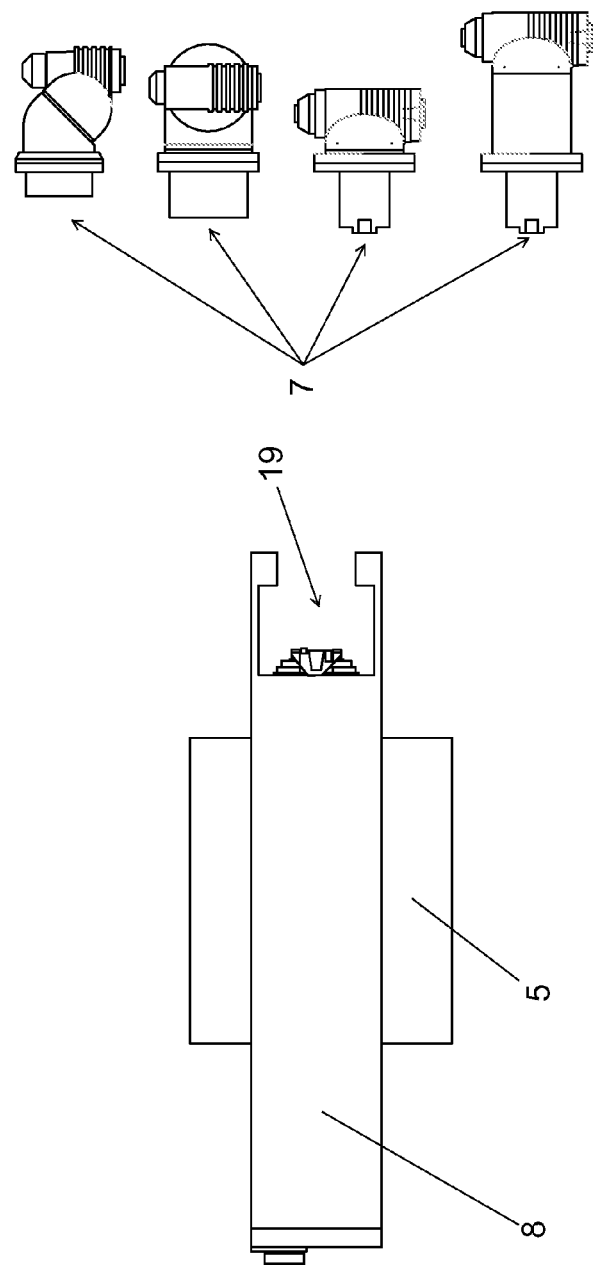
FIG. 6 shows the possibility of arranging different types of headstocks on one and the same machine.

Therefore, by moving the shank core (13) to its most retracted position and removing the front unit by means of the outwards extraction thereof, a space (19) is left where the shaft (9) of the headstock (7) can be housed. As can be observed in FIG. 5, said shaft (9) of the headstock (7), is inside the tool box (8), such that the headstock (7) is at a distance (X') closest to the column (4), whereby the usable working area is improved among other things. FIG. 6 shows the possibility of arranging different types of headstocks (7) in the space (19).

The possibility that the front and rear units are separated by a certain distance, such that the front unit can be removed by means of the inwards movement thereof has been envisaged, therefore, a space (19) where the shaft (9) of the headstock (7) can be housed is left by moving the shank core (13) to its most retracted position. In this case since the rotating bushes (14 and 17) of the rear and front units are not attached to one another, the shank core (13) has an associated rotation on its entire surface, rotating integrally with the rotating bush (17).

It has also been envisaged that the bearings (16) which are arranged between the rotating bushes (14 and 17) and the fixed bushes (15 and 18) are angular-contact ball bearings, with which the rotation speed is increased and the frictions are minimized. However, without altering the concept of the invention, they can also be other types of bearings, such as for example, magnetic bearings, hydrostatic bearings, aerostatic bearings, or other types of bearings having a low friction coefficient.

Figure 7A:
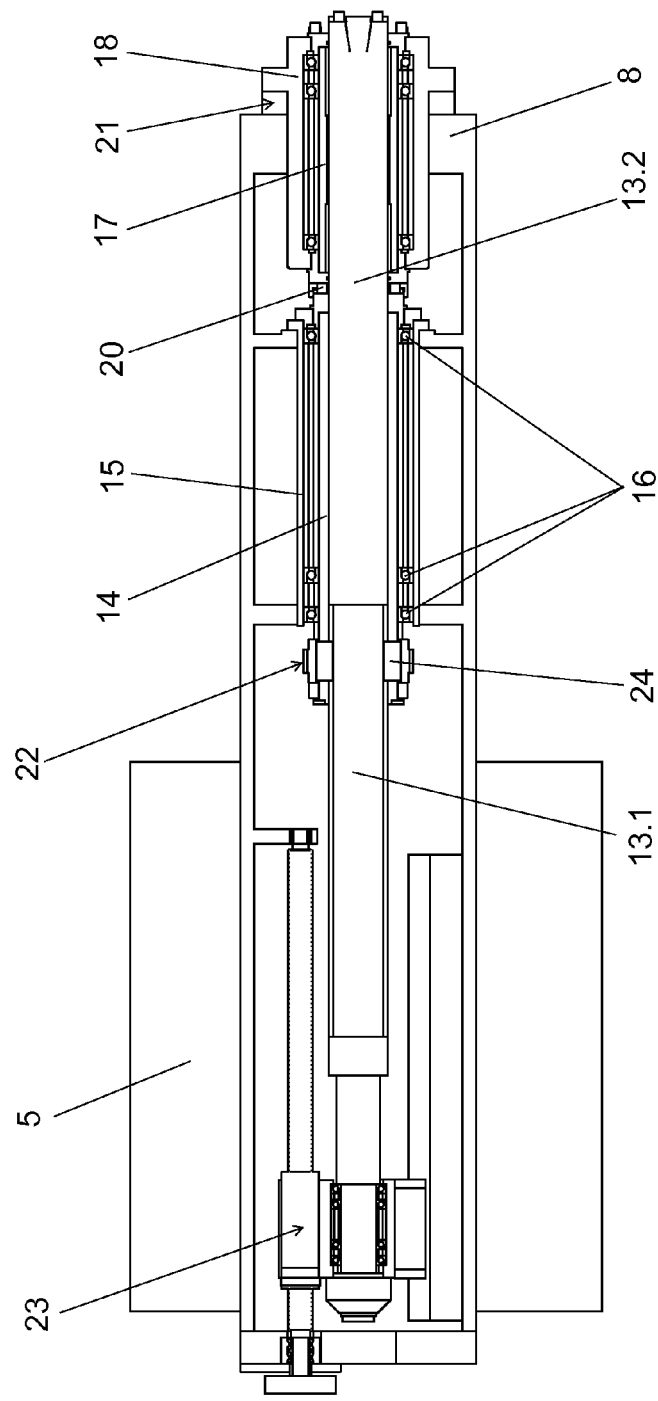
FIGS. 7A to 7C show another practical embodiment of the invention, where the shank is separated into a rear portion and at least one front portion which can be extracted from the tool box.
Figure 7B:
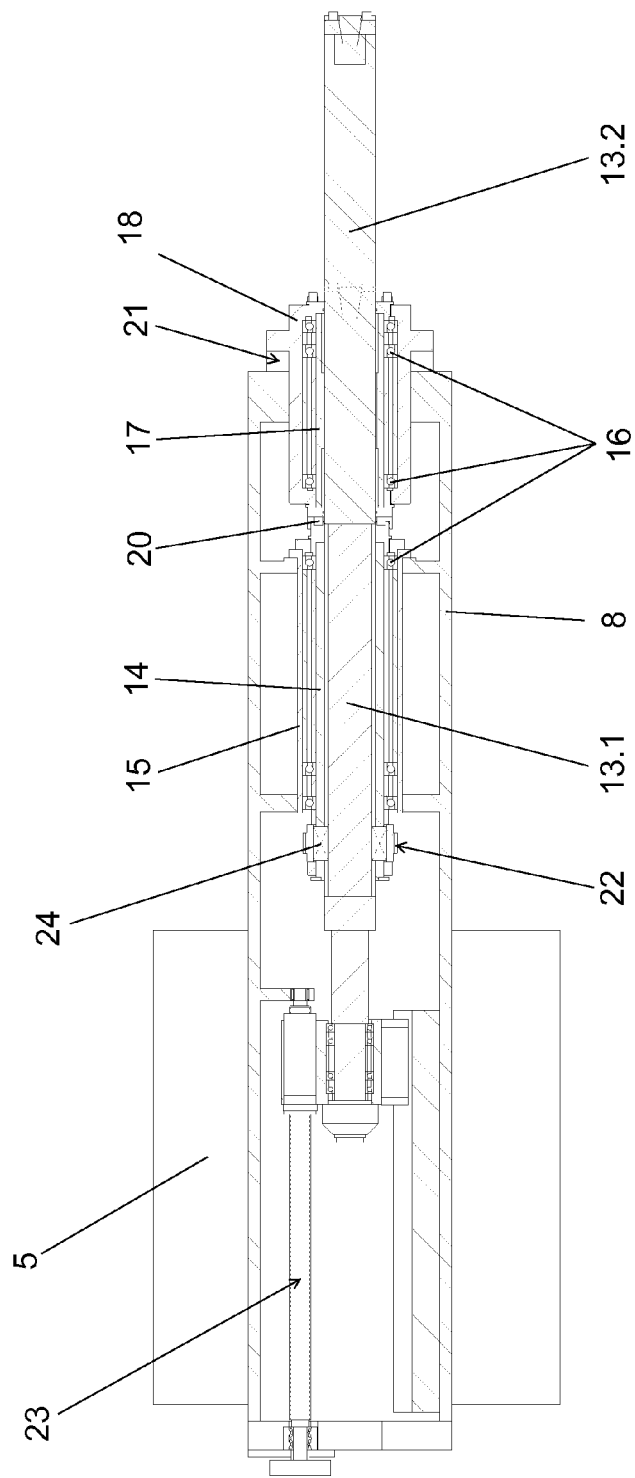
Figure 7C:
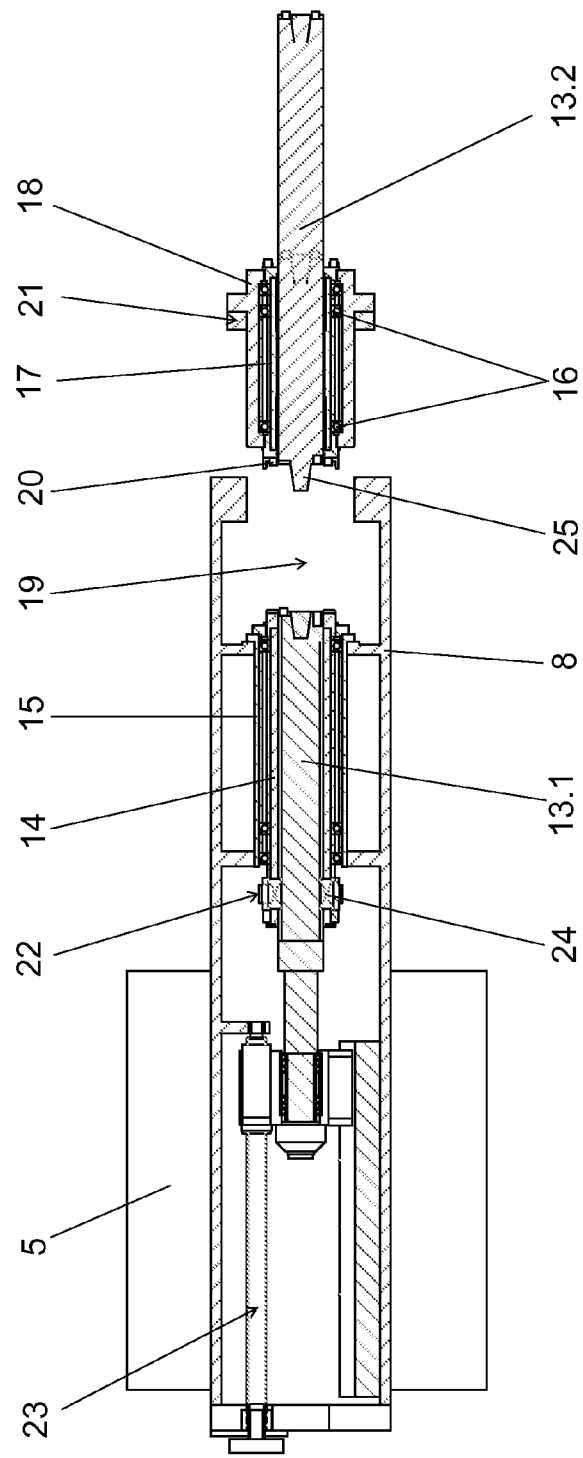

FIGS. 7A to 7C show another embodiment of the invention, where the shank core (13) is formed by a rear portion (13.1) arranged permanently inside the tool box (8) and at least one removable front portion (13.2), such that the front portion (13.2) can be separated during the working phase, with respect to the rear portion (13.1), by means of the outwards extraction thereof together with the front unit, formed by the rotating bush (17) which is associated, by means of the bearings (16), with respect to the fixed bush (18), such that a space (19) is left for housing the shaft (9) of the headstock (7). In this case the rear and front portions (13.1 and 13.2) of the shank core (13) are attached to one another through attachment means (25) for their synchronized rotation.

Figure 8:
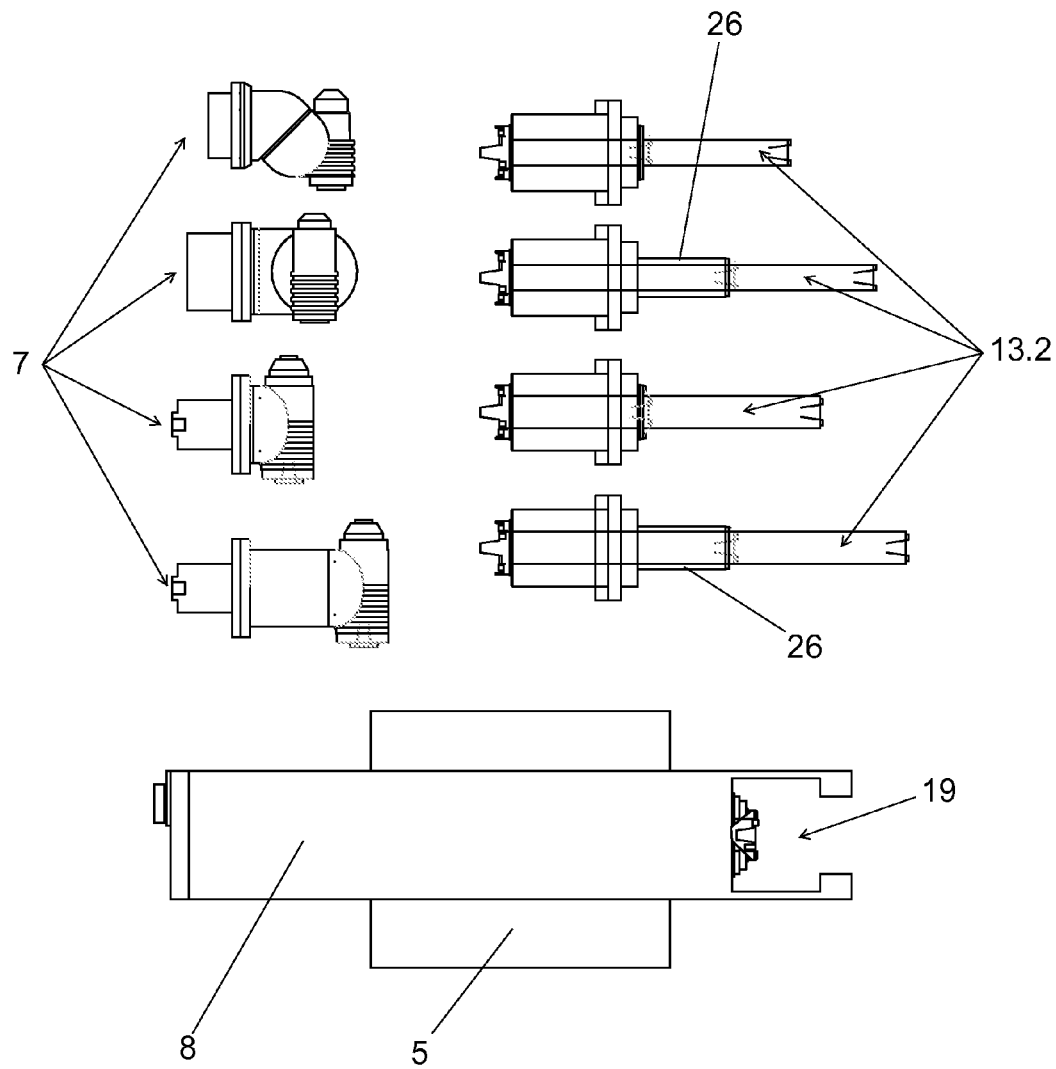
FIG. 8 shows the possibility of arranging, with the solution from the figure above, different types of headstocks or front portions of shank on one and the same machine.

With this solution, such as observed in FIG. 8, different heads (7) as well as front portions (13.2) of the shank core (13) of different lengths and diameters can be selectively arranged in the space (19) defined in the tool box (8).

Therefore the front unit can be adapted therein in correspondence with the front portions (13.2) of the shank core (13) of different diameters, whereas on the other hand, it has been envisaged that the front unit is complemented with a module (26) for adapting front portions (13.2) of the shank core (13) with an excessive length.

The invention claimed is:

1. A retractable shank for machine tools of application in a machine comprising a horizontal table on which there is arranged a part to be machined, a column on which a carriage carrying a tool box slides vertically, in which tool box there is arranged the shank, wherein the shank is coupleable to a headstock by a shaft of the headstock, wherein the shank is made up of a shank core and a front unit, wherein the front unit is arranged on the shank core and formed by a rotating bush which is associated by bearings with a fixed portion of the machine, this front unit being removable by outwards extraction or inwards movement, leaving a space in which the shaft of the headstock can be housed when the headstock is coupled to the shank.

2. The retractable shank for machine tools according to claim 1, wherein the fixed portion of the machine structure is a fixed bush forming part of the front unit and coupled to the tool box.

3. The retractable shank for machine tools according to claim 1, wherein the shank core is separated into a rear portion arranged permanently inside the tool box and at least one front portion which is removable by an outwards extraction thereof together with the front unit.

4. The retractable shank for machine tools according to claim 3, wherein the front unit is adaptable to front portions of the shank core of different diameters.

5. The retractable shank for machine tools according to claim 3, wherein the front unit is susceptible to being complemented with a module for adapting the front portions of the shank core with an excessive length.

6. The retractable shank for machine tools according to claim 1, wherein the bearings are bearings with a low friction coefficient.

7. The retractable shank for machine tools according to claim 1, wherein the bearings are angular-contact ball bearings.

8. The retractable shank for machine tools according to claim 1, wherein the bearings are magnetic bearings.

9. The retractable shank for machine tools according to claim 1, wherein the bearings are hydrodynamic bearings.

10. The retractable shank for machine tools according to claim 1, wherein the bearings are aerostatic bearings.

11. A retractable shank in a machine tool comprising a shank core coupleable to a headstock by a rear rotating shaft of the headstock, and a front unit arranged on the shank core and formed by a rotating bush which is associated by bearings with a fixed portion of a structure of the machine tool, wherein the front unit is removable, and a space is left by removal of the front unit in which a rear rotating shaft of the headstock can be housed.

12. The retractable shank in machine tools according to claim 11, wherein the front unit is removable by outwards extraction thereof.

13. The retractable shank in machine tools according to claim 11, wherein the front unit is removable by inwards movement thereof.

14. The retractable shank in machine tools according to claim 11, wherein the shank core is separated into a rear portion and at least one front portion which is removable by outwards extraction thereof together with the front unit, leaving a space for housing the rear rotating shaft of the headstock.

* * * * *